P. W. HODGKINSON.
POWER MECHANISM.
APPLICATION FILED OCT. 20, 1913.
1,089,053.
Patented Mar. 3, 1914.
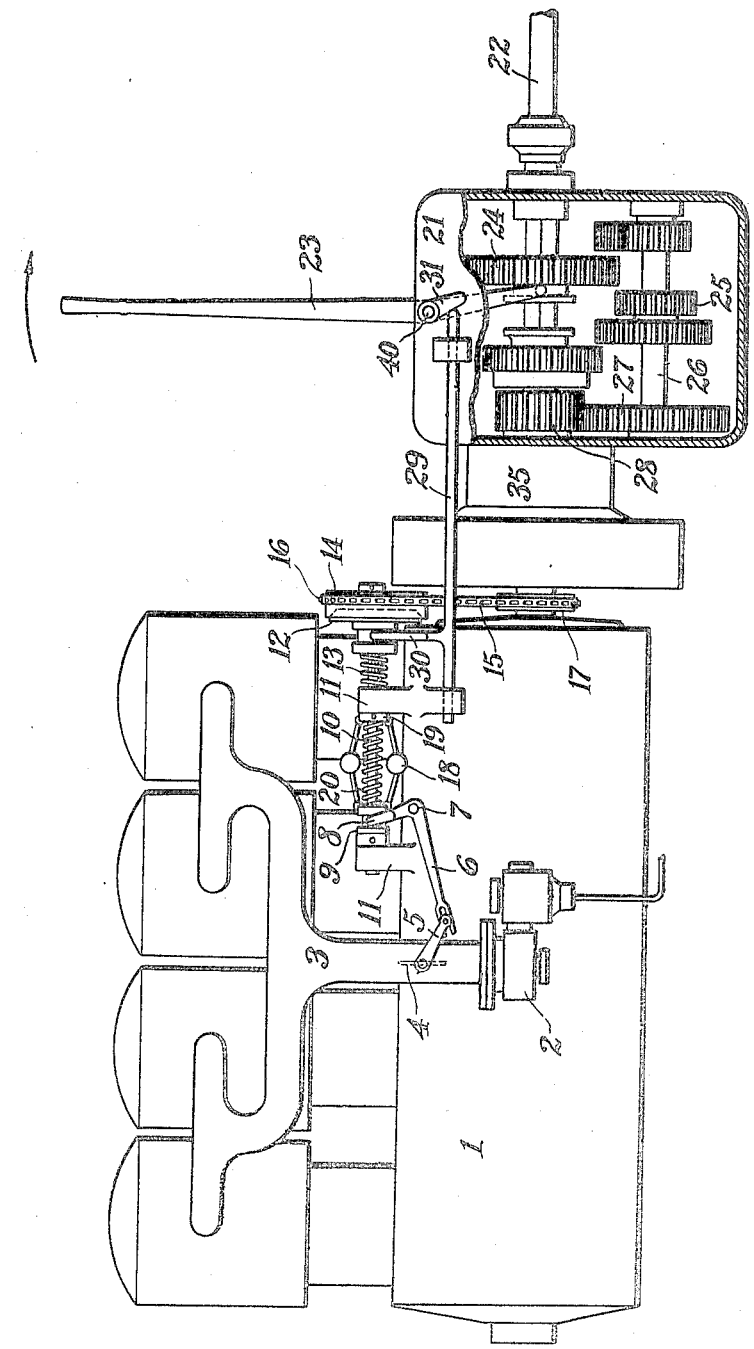
Witnesses:
Clarence W. Carroll
Edith A. Carroll
Inventor:
Perry W. Hodgkinson

UNITED STATES PATENT OFFICE.

PERCY W. HODGKINSON, OF ROCHESTER, NEW YORK, ASSIGNOR OF ONE-HALF TO CLARENCE W. CARROLL, OF ROCHESTER, NEW YORK.

POWER MECHANISM.

1,089,053.  Specification of Letters Patent.  Patented Mar. 3, 1914.

Application filed October 20, 1913.   Serial No. 796,341.

*To all whom it may concern:*

Be it known that I, PERCY W. HODGKINSON, a citizen of the United States, and resident of Rochester, in the county of Monroe and State of New York, have invented certain new and useful Improvements in Power Mechanisms, of which the following is a specification.

This invention relates to power mechanisms, and the object of the invention is to provide means for controlling the speed of a prime mover or engine of any kind, and to so arrange the controlling means that the latter automatically become inoperative under certain conditions.

The drawing illustrates the invention as applied to the power plant of a motor vehicle, and shows a side elevation of the motor and adjacent parts in a somewhat diagrammatic manner.

In power transmission mechanisms used in motor vehicles, particularly those used for carrying freight, it is desirable that the speed of the vehicle on the road shall not exceed a certain number of miles per hour. It is common practice, to meet this requirement, to limit the road speed by means of automatic governing device which will operate to throttle the fuel-supply, cut out the ignition, or in some other manner reduce the speed of the motor when the latter or the speed of the vehicle reaches a predetermined limit. At times, however, it may be found that the limit of speed set for the motor is too low, and that the automatic operation of the governor at such a time results in the production of less power than is required, as the power delivered by a motor is proportional to its speed. For instance, in attempting to drive a motor vehicle operated by an internal-combustion motor up a steep hill it is common practice to run the motor up to its speed limit, and then shift the transmission or gear-set to "low-gear." When this is done the hill can usually be negotiated successfully, as the motor running at high speed is able to develop for a time a greater amount of power than is needed in normal operation. If the motor is throttled or otherwise held down to a certain speed limit by an automatic governing device, it cannot produce the power necessary to move the vehicle under such conditions as just described, even though driving on "low-gear."

This invention overcomes the aforementioned difficulty by providing means whereby the governing device, though normally operative, is automatically disconnected and rendered of no effect when the vehicle is being driven in "low-gear." As a great many revolutions of the motor are usually required to each revolution of the road wheels or the power shaft in "low-gear" it follows that even though the motor runs at high speed, the vehicle will not move faster than the desired limit of road speed, and generally not even that fast.

In the embodiment of the invention illustrated, the motor 1 is represented as a well-known type of internal-combustion engine, adapted to the use of hydro-carbon gas that is generated in a suitable carbureter 2, the gas passing to the cylinders through a supply pipe 3. A valve 4 is located at a convenient point in the pipe 3, and is represented as a "butterfly" valve, such as is commonly used to control the flow of gas in engines of this kind, and which is so arranged that a movement of the valve on its axis through 90 degrees carries it from fully open to fully closed position. The valve 4 is operable through its full range of movement by an arm 5 outside the pipe 3, and this arm has a slot-and-pin connection with one arm 6 of a bell-crank lever that is pivoted at 7 on the motor. The upper arm 8 of the bell-crank lever engages an annular groove in a collar 9, slidably mounted on a shaft 10, which in turn is revolubly supported in bearings 11.

At one end of the shaft 10, and also slidably mounted upon it, is one member 12 of a clutch. This member is arranged so that it always rotates with the shaft 10, regardless of its position on the latter. A spring 13 between the member 12 and one of the bearings 11 tends at all times to force said member into engagement with the other portion 14 of the clutch. The latter is free to revolve upon the shaft 10, but is arranged to turn with the motor, and at a speed that invariably is proportional to the motor speed. A convenient method of connecting the motor and the clutch is illustrated as comprising a chain 15 running on a sprocket 16 that is integral with the clutch-member 14, and on another sprocket 17, fixed to the motor-shaft.

The governor 18 which controls the speed of the motor is mounted on the shaft 10, and is shown as an ordinary fly-ball governor, although it will be understood that any suitable device capable of performing the functions of a governor may be used. One pair of the ball-arms is attached to a collar 19, fixed on the shaft 10, while the other pair of arms are attached to the collar 9 that engages the end 8 of the bell-crank lever before described. A spring 20 tends to restore the governor to the position indicated, and in this position the valve 4 is fully open. When the motor is running the action of the governor moves the collar 9 toward the right and closes the valve 4 more or less, reducing the gas flow accordingly and thereby limiting the speed of the motor, as will be apparent from reference to the drawing. The foregoing is common practice at the present time.

Located at a convenient point is a variable-speed mechanism 21, that is adapted to connect the motor with a shaft 22, (hereinafter called the driven shaft) and to establish different speed ratios between the motor and said shaft. Any mechanism may be employed which will accomplish this result, but the device shown herewith represents a "sliding-gear transmission" such as is in common use on motor-vehicles.

It is unnecessary to describe in detail the operation of the gear-set shown, the same being so well known in the art. Any desired speed ratio between the motor and the driven shaft 22 is obtained by moving the selector 23, which causes the engagement of certain gears, according to the direction of its movement.

In the drawing the arrangement of the gear-set is shown to be such that if the selector is fixed to the pintle 40 on which it swings, a movement of the selector in the direction of the arrow results in a movement of the large gear 24 in the opposite direction. This brings the gear 24 into mesh with the gear 25 on the countershaft 26, which, in turn, is revolved by the gear 27 that is always in mesh with a smaller gear 28 on the motor shaft. The gear 24 being constructed to rotate only with the driven shaft 22, it follows that the difference in the relative speeds of the motor and the driven shaft will be greatest when the gears 24 and 25 are in mesh, or in other words, when the mechanism is operating in "low-gear." To render the governor inoperative at this time, means are provided whereby a movement of the selector as indicated will disengage the clutch-members 12 and 14. A rod 29, slidably mounted in fixed bearings, carries a fork 30 that coöperates with an annular groove on the member 12. An arm 31, fixed to the selector or to the shaft 40, is so constructed as to push the rod 29 toward the left whenever the gear 24 is moved into mesh with the gear 25, but has no effect on said rod when any other gear is being moved by the selector. The aforesaid movement of the rod 29 disengages the clutch-members 12 and 14, so that the governor is no longer driven, but comes to rest in normal position, thereby opening the valve 4. The motor may then be controlled by the usual manually-operated throttle on the carbureter or wherever it may be. This valve is not shown. A suitable clutch may be interposed between the motor and the variable-speed device, as indicated in the drawing by the numeral 35, the same being common practice, but forming no part of this invention.

The embodiment of the invention herein described and illustrated is intended merely as one mode of application, and the invention is not limited to this particular construction, but is capable of use with any form of motor, having any governing apparatus, if a variable-speed device of any type is interposed between the motor and the member or mechanism driven thereby, as defined in the following claims.

I claim:

1. In a power mechanism, the combination of a motor; a driven member; variable-speed mechanism between the motor and the driven member; a governor for the motor; and means whereby the governor is rendered inoperative when a predetermined relative speed of the motor and the driven member is established.

2. In a power mechanism, the combination of a motor; a driven member; variable-speed mechanism for establishing different speed-ratios between the motor and the driven member; a governor for the motor; and means whereby the governor is automatically rendered inoperative at a predetermined point in the operation of the variable-speed mechanism.

3. In a power mechanism, the combination of a motor; a driven member; variable-speed mechanism between the motor and the driven member; a governor for limiting the speed of the motor; and means coöperating with a member of the variable-speed mechanism whereby a movement of the latter renders the governor inoperative.

4. In a power mechanism, the combination of a motor; a driven member; variable-speed mechanism connecting the motor and the driven member and adapted to produce different speed ratios between said motor and said driven member; a governor for limiting the speed of the motor; and means for automatically rendering the governor inoperative when the variable-speed mechanism is set to produce a predetermined speed ratio between the motor and the driven member.

5. In a power mechanism, the combination of a motor; a driven member; variable-speed mechanism between the motor and the driven member; a governor adapted to be operated by the motor; and means coöperating with the variable-speed mechanism whereby a given movement of the latter automatically disconnects the governor from the motor.

6. In a power mechanism, the combination of a motor; a driven member; variable-speed mechanism between the motor and the driven member adapted to be connected and disconnected with both; a governor connected with the motor; and means coöperating with the variable-speed mechanism whereby a given movement of the latter automatically disconnects the governor from the motor.

7. In a power mechanism, the combination of a motor; a driven member; variable-speed mechanism adapted to produce different speed ratios between the motor and the driven member; a governor operated by the motor; and means coöperating with the variable-speed mechanism whereby a predetermined movement of the latter releases the governor from the motor and renders it inoperative.

8. In a power mechanism, the combination of a motor; a driven member; variable-speed mechanism adapted to connect said motor and said driven member at different speed ratios; a governor operated by the motor and adapted to be disengaged therefrom; and means coöperating with one or more members of the variable-speed mechanism whereby at a predetermined movement of the latter the governor is disengaged from the motor.

9. In a power mechanism, the combination of a motor; a driven member; variable-speed mechanism between the motor and the driven member; a governor for the motor having a clutch connection therewith; and means operated through connections with the variable-speed mechanism whereby a predetermined movement of the latter disengages the clutch and renders the governor inoperative.

10. In a power mechanism, the combination of a motor; a driven member; variable-speed mechanism between the motor and the driven member for establishing different speed-ratios of one to the other; a governor for the motor; and connections between the variable speed mechanism and the governor whereby a predetermined movement of the variable-speed mechanism renders the governor inoperative.

11. In a power mechanism, the combination of a motor; a driven member; variable-speed mechanism between the motor and the driven member adapted to be connected with or disconnected from either said motor or said driven member, or both; a governor connected with the motor; and means adapted to be actuated by one or more members of the variable-speed mechanism whereby a predetermined movement of the latter disconnects the governor from the motor and renders it inoperative.

PERCY W. HODGKINSON.

Witnesses:
 HOMER E. A. DICK,
 CLARENCE W. CARROLL.